Feb. 18, 1969

B. V. HEWES 3,428,941

COMBINED CRASH LOCATOR AND EMERGENCY
EXIT LAMP DEVICE FOR AIRCRAFT

Filed April 7, 1966

INVENTOR.
BASIL VICTOR HEWES
BY
*Sperry and Soda*
ATTORNEYS

United States Patent Office 3,428,941
Patented Feb. 18, 1969

3,428,941
COMBINED CRASH LOCATOR AND EMERGENCY
EXIT LAMP DEVICE FOR AIRCRAFT
Basil Victor Hewes, College Park, Ga. 30022
Continuation-in-part of application Ser. No. 493,145,
Oct. 5, 1965. This application Apr. 7, 1966, Ser.
No. 540,993
U.S. Cl. 340—27          10 Claims
Int. Cl. G08b 5/36, 21/00

ABSTRACT OF THE DISCLOSURE

A source of electricity has a pair of conductors, through one of which power is supplied to a high-intensity crash-locator lamp, mounted in the outer wall of an aircraft fuselage adjacent an emergency exit, to permit swift location of a crashed aircraft, and in particular an emergency exit thereof. Power is supplied through the outer conductor to a lamp mounted in the inner wall of the fuselage and directing a muted light inwardly to indicate to passengers the exit location. Both lamps are energized responsive to a predetermined deceleration force. Means is provided to manually close or open the lamp circuit should this become important.

---

This application is a continuation-in-part of my copending application Ser. No. 493,145, filed Oct. 5, 1965, titled, "Emergency Exit Signal Device for Aircraft."

The present application covers a generally improved version of the device shown in my co-pending application.

As was true of the invention described and claimed in the above-designated co-pending application, the invention relates generally to emergency illuminating and signaling devices intended for use mainly in aircraft, and adapted to operate under serious impact or distress conditions resulting from crashing of the aircraft.

It is worthy of observation, by way of background, to note that when an aircraft crashes, a delay of even a few seconds in evacuation of the aircraft by survivors of the crash becomes, in the literal sense of the term, a matter of life or death. Aircraft crashes have occurred, for example, in relatively shallow water, which may yet be deep enough to submerge the aircraft. In such instances, survivors must obviously locate emergency exits and evacuate the craft with all possible speed. Moreover, rescue teams must be able to locate the aircraft as promptly as possible and be guided to any accessible emergency exits which may not have been opened due to jamming on impact or for any other reason. Their failure to do so can be fatal, and has in fact caused considerable loss of life in crashes that have occurred, as evidenced by the findings of investigators of such crashes.

It is important that a device intended to operate responsive to crash conditions be normally inconspicuous, since it has been found by airline management that passengers, particularly those whose flight experience is limited, view with considerable apprehension any visible indications or reminders that the aircraft is capable of crashing and might in fact do so.

It is further important that an illuminating device for locating the emergency exits of aircraft be designed to operate instantly in response to sudden impact such as occurs when the aircraft strikes the water or the ground under crash conditions. It is obviously of equal importance that such a device be rugged enough to withstand extreme deceleration forces resulting from the impact of the aircraft against the water or ground, without adverse effect on the operability or efficiency of the device in the discharge of its intended function.

The discussion above, of the background and problems leading to development of the present invention, has related mainly to the provision of an interiorly disposed emergency light for aircraft visible instantly, on impact, to the passengers for the purpose of swiftly locating emergency exits. In this connection, while the interior lighting of such exits is of great, possibly even of primary importance, such lighting should not be so brilliant or operated in a manner which might add to confusion. On the other hand, it is also of great concern to operating airlines and to crash-locating and -investigating agencies that the wrecker aircraft be found with an absolute minimum of delay. Thus, one of the problems that has constantly harassed rescue squads has been an inability to make a prompt determination of the location of the aircraft and its exit hatches, since the crashed plane is usually engulfed in smoke, fog or foam. Painted exit markings on the exterior of the fuselage are difficult to locate under such conditions. In order to achieve maximum efficiency in rescue operations groping and searching for the emergency exit doors or windows must be eliminated. A brilliant light issuing outwardly from a port in the fuselage directly adjacent the emergency exit hatch will be immediately visible to all approaching rescue teams, especially if the light flashes on and off. Therefore, a powerful externally visible signal light will speed rescue operations regardless of the poor conditions of visibility brought on by smoke, fog, chemical foam, etc. Obviously, this is of especial importance not only because rescuers may be able to save lives by swift initiation of rescue operations, but also because investigation of the causes of the crash is brought to its maximum efficiency if the procedures incident thereto are begun before deterioration or loss of the parts of the wrecked craft, whether intact or fragmented.

In view of all the above, I have proposed to provide a device which will respond instantly to sudden impact resulting from the crash of an aircraft, in such a way as to place into operation, substantially at the moment of impact, means which will, at one and the same time, provide both an adequate interiorly disposed emergency exit locator light which will not confuse passengers endeavoring to escape from the aircraft, and a brilliant, exteriorly projected, visible signal which may be seen from a great distance so as to facilitate the location of the aircraft by search agencies.

Among important objects of the present invention, in this regard, are the following:

To provide a device of the character stated which will discharge both adequate interior and brilliant exterior signaling functions noted above, though still comprising a single, compact, unitary assembly;

To provide a device as stated which, under normal conditions, will be so inconspicuously designed and located as to pass unnoticed by the casual viewer;

To provide a combined crash and emergency exit locator device which will utilize a combination of two lamps, an interiorly facing translucent panel, and an exteriorly facing dome lens, in such a way as to project to the exterior of the aircraft light beams of maximum intensity so as to facilitate location of the craft by search parties, while at the same time providing a diffused lighting of emergency exits within the aircraft, in a manner that will not confuse or unduly alarm passengers seeking emergency exits;

To provide a device of the character stated which will be so designed as to be installed with speed and ease in existing aircraft of different types, with minimum modification or redesign either of the aircraft structure or of the device itself;

To provide an emergency light assembly as stated above that will comply fully with all existing or anticipated requirements of both regulatory agencies and operating national and international airlines;

To so form a device of the character stated as to impart thereto a high degree of ruggedness, strength, durability, and adaptability for sure and trouble-free operation under emergency conditions; and To provide an emergency exit locator light which, if desired, can be operated manually rather than by automatic response to sudden impact, and which also can be turned off manually in the event it is set into operation accidentally.

Still another object of the invention is to provide a device of the character stated which will include an exteriorly facing crash locator lamp device that in itself will comprise a preassembled, unitary component of the complete assemblage previously described herein, said component being novelly constructed and assembled to provide maximum protection for the lamp incorporated therein, maximum ease of attachment of the same to the outer skin of the aircraft fuselage, and an effective sealing arrangement which will ensure against the loss of pressurization within the aircraft.

Other objects will appear from the following description, the claims appended thereto, and from the annexed drawings, in which like reference characters designate like parts throughout the several views, and wherein:

Figure 2:
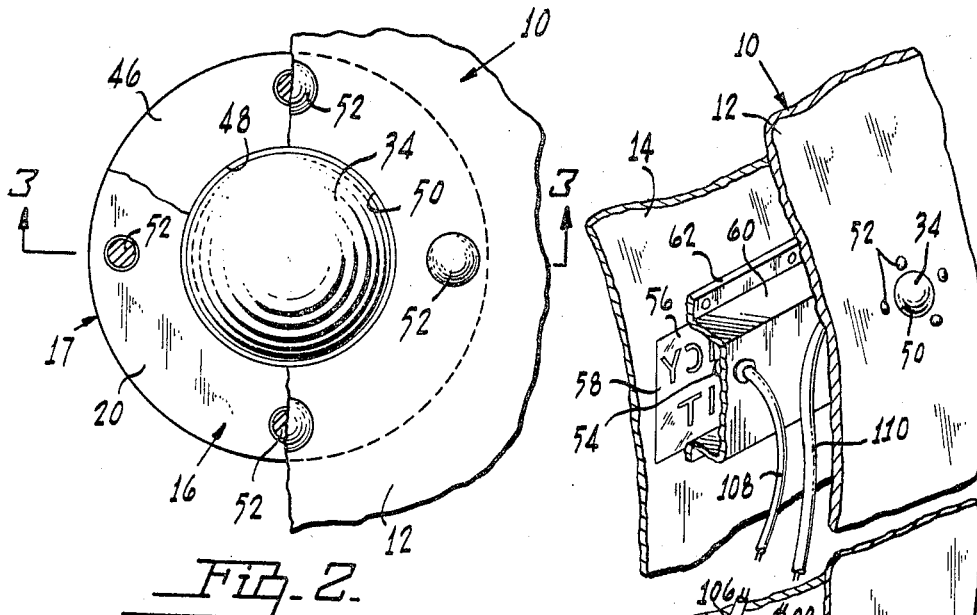
FIG. 2 is an enlarged view of the crash locator light as seen in front elevation, a portion of the crash locator light being broken away, the fuselage of the aircraft being illustrated fragmentarily.

Referring to the drawing in detail, the reference numeral 10 generally designates the fuselage of a typical, present-day aircraft. This includes outer and inner walls 12, 14 respectively. In many types of aircraft in which the invention would be used, pressurized cabins are provided, and in this event, a complete sealing of the outer wall is of great importance.

Figure 1:
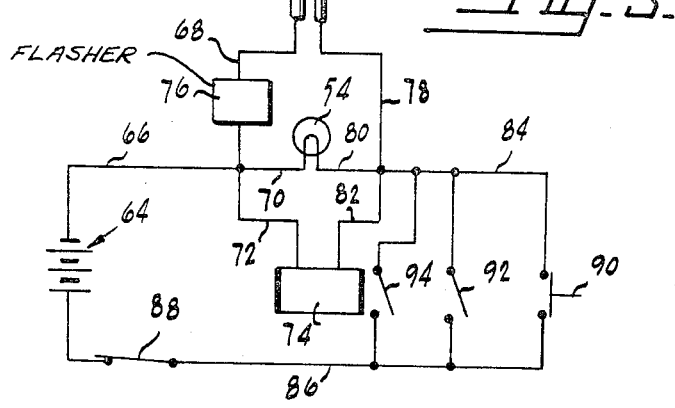
FIG. 1 is a fragmentary perspective view of a portion of an aircraft fuselage, showing the inner and outer walls thereof, and illustrating a typical mounting of the invention in said aircraft.

The invention has been generally designated 16, and has been illustrated in a typical mounting arrangement in FIG. 1 of the drawing. As seen in this figure, the invention includes a rectangular casing mounted in the space or cavity between walls 12, 14, from which extends conductors, one of which leads to the exteriorly facing crash locator light shown in FIGS. 2 and 3, and the other of which leads to an emergency exit light that faces interiorly of the cabin to permit the passengers to observe the location of the emergency exit in the event of a crash.

Figure 3:
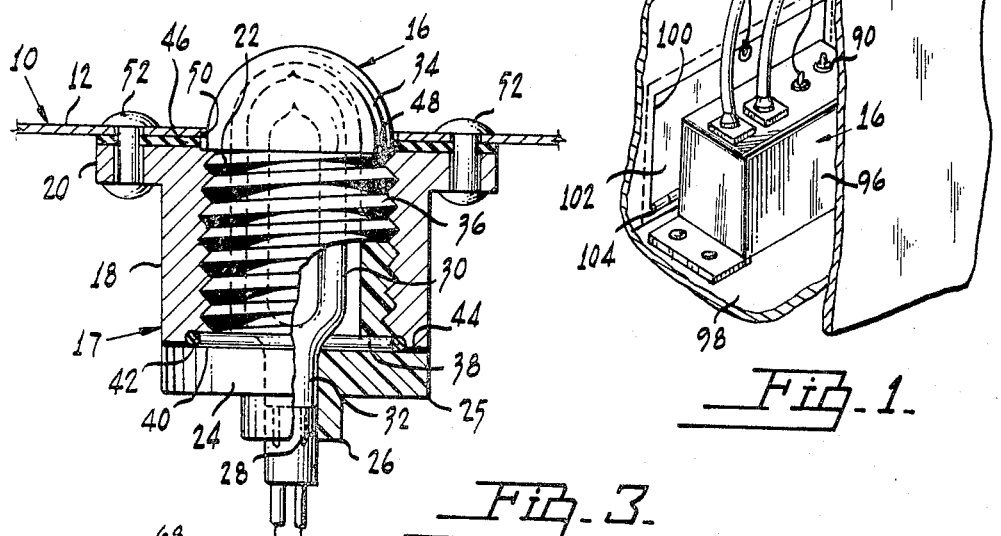
FIG. 3 is a sectional view on the same scale as FIG. 2, taken substantially on line 3—3 of FIG. 2, further including an electrical diagram of the circuit incorporated in the invention.

Referring to FIGS. 2 and 3, wherein the exteriorly facing light is shown in detail, said light includes a housing generally designated 17. Housing 17 is formed to include a tubular body 18. Body 18, which is formed of a metal material of requisite strength to withstand the heavy forces resulting from impact on crashing of an aircraft, is formed at its outer end with an outwardly directed, planiform, angular flange 20.

Body 18 is formed with an end-to-end, large diameter, axial bore 22, which in the illustrated, preferred embodiment of the invention is threaded for its full length.

Housing 17 also includes a base 24, formed from a single piece of electrically insulative material, in the illustrated example. Base 24, thus, can be of molded thermosetting phenolic material or the like, and as shown includes a generally flat, circular body portion 25 the outer diameter of which is the same as the outer diameter of the body 18, whereby the base constitutes an extension of body 18 in the assembled relation of the parts. Depending from the center portion of body 25 is an annulus 26 and formed in the annulus and body 25 is a through, center opening 28.

A stroboscopic lamp 30, which per se is conventional, is mounted upon the base 24 of housing 17, and includes a base portion 32 sealably mounted in the center opening 28.

The lamp 30, as shown in FIG. 3, projects upwardly, centrally through the bore of the body 18 of the housing, and at its outer end extends beyond the flanged end of said body 18. Covering the projecting outer end of the lamp is a hemispherical portion of a dome lens 34, formed of a thick, clear plastic such as "Lucite" molded to include a cylindrical, elongated body portion 36 integral with and extending inwardly from the hemispherical portion of the lens. Body 36 of the lens is coextensive, substantially, with the bore 22 of the body 18 of housing 17, and is formed with an open inner end 38 that is in registration with the bottom wall of a counterbore 40 formed in the inner end of body 18 in communication with bore 22 thereof.

Seated in counterbore 40 is a compressible O-ring 42, providing a seal between body 18 and base 24.

The base 24 is permanently secured, throughout its circumference, to the inner end of the body 18 as by an epoxy bond 44. In this connection, in a preferred embodiment the O-ring can be of a thickness slightly greater than the depth of the counterbore, so that when the base 24 is bonded to body 18, the O-ring will be compressed, thus to cooperate with the bond 44 in providing a leak-tight connection between base 24 and body 18. It will be noted, in this regard, that the O-ring is of greater diameter than the outer diameter of the body portion 36 of lens 34. As a result, any tendency toward leakage between the threads of body 18 and body portion 36, which tendency might produce leakage of air or moisture between the outer atmosphere and the cavity between walls 12, 14, is precluded.

Seated upon the flange 20 is a flat, annular gasket 46, having a center opening 48 in registration with and of the same diameter as an opening 50 formed in the outer wall 12 of the fuselage 10. The gasket, wall 12, and flange 20 are formed with registered openings, which openings can be angularly spaced 90° apart about the lens as shown in a typical embodiment. Extending through the openings are rivets 52, which mount the housing 17 against the inner surface of the fuselage 12, with the lens 34 projecting through opening 50 as shown. In this connection, the gasket opening is reduced in diameter, when the riveting action is completed, due to the fact that the rivets are so proportioned as to cause the gasket 46 to compress, whereby to provide a seal about the rivets, where the rivets pass through the gasket 46. Here again, leakage is prevented between the cavity that is provided between walls 12 and 14, and the outer atmosphere.

It is to be noted, in this regard, that instead of rivets, I may use machine screws, bolts and nuts, or any other fastening means that may be suitable for or particularly adapted or required for a specific installation.

It will be understood that the crash locator light shown in FIGS. 2 and 3 can be mounted wherever desired upon the fuselage. In some instances, the crash locator light might be located upon the top of the fuselage, and in other instances at the side thereof. Or, the light may be located at a curved portion of the fuselage such as to cause the light to be visible both from above, and from the side, in the event of a crash. It is important that visibility of the light be provided from above, for example, in a situation in which the aircraft may go down in water, in which event location of the aircraft below the surface of the water can be facilitated and speeded by provision of a high-intensity lamp that can be seen from above the surface.

The invention also includes, as previously discussed herein a signal lamp 54 that faces interiorly of the aircraft, so as to inform passengers of the location of an emergency exit, whether it be a door or a window. In the illustrated example, lamp 54 is disposed in back of a translucent, rectangular panel 56, which can be marked with the words "emergency exit." Panel 56 may be so designed as to cause the words to be invisible, when the lamp 54 is dark. If, however, lamp 54 is energized, the panel 56 will be illuminated from the rear, and will immediately be visible to the passengers so as to show the location of the emergency exit.

This arrangement is of importance, in view of the fact that the passengers do not, it has been found, prefer to see visible indications, during normal flight, of a potential disaster. This is particularly true of passengers who have not had much flight experience.

In any event, in the illustrated example of the invention, the panel 56 is permanently mounted within an opening 58, with lamp 54 being disposed directly in back of the panel, said lamp being mounted on the back wall of a rectangular, open-front lamp housing 60 having a mounting flange 62 secured to the inner wall 14 in which opening 58 is provided.

Both the crash locator light shown in FIGS. 2 and 3, and the signal lamp shown to particular advantage in FIG. 1, are powered from the same electrical source. This has been generally designated 64, and comprises a battery of suitable design that will permit continuous operation of the lamps over a predetermined, required period of continuous energization, as for example 24 hours. The battery 64, further, is completely divorced from any other part of the electrical system of the aircraft, so that the emergency device will operate despite any disruption of the electrical supply of the aircraft, such as would likely occur in the event of a serious crash.

In FIG. 3, I have illustrated a circuit by means of which the invention can be used to advantage. In the illustrated schematically shown circuit, I provide a lead 66 extending from one terminal of battery 64. Extending from a common junction with lead 66 is a lead 68 extending to one terminal of lamp 30, a lead 70 extending to one terminal of lamp 54, and a lead 72 extending to one terminal of a relay 74. Connected in lead 68, in series with lamp 30, is a flasher device 76 or the like, designed to produce a flashing or intermittent operation of the lamp 30 when a circuit is closed therethrough.

Extending from the other terminals of lamp 30, lamp 54, and relay 74, are leads 78, 80, 82 respectively, extending to a common junction with a lead 84. Leads 66, 84 constitute one side of the circuit, and as will be observed, lamps 30 and 54 and relay 74, are all connected in parallel in said side of the circuit.

The other side of the circuit is provided by a lead 86 ertending from the other terminal of the battery 64. Connected in parallel between the opposite sides of the circuit are a momentary, normally open switch 90, a normally open inertia switch 92, and relay contacts 94 adapted to be closed when current flows through the winding of the relay 74. The switches 90, 92, 94, connected in parallel as stated, are so located in respect to the lamps and relay as to require that current passing through any one of the switches 90, 92, 94 also passes through the lamps 30, 54, and the winding of the relay 74.

In the side 86 of the circuit, I provide a normally closed, main control switch 88. This is so located, as shown in FIG. 3, as to open the circuit through the lamps and through the winding of the relay, despite the fact that one or more of the switches 90, 92, 94 may be closed at the moment.

The momentary switch 90, and the switch 92, are so located as to be readily accessible to a member of the crew of the aircraft. Referring to FIG. 1, these switches are disposed in conveniently accessible positions on the top wall of a casing 96, in which battery 64 and flasher 76 would be housed. Casing 96 is mounted upon a cross member 98 of the aircraft fuselage, or upon any suitable mounting bracket that may be desired. Casing 96 is located directly in back of an access opening 100, normally closed by a panel 102. Panel 102 can be hinged as at 104, to the bottom edge of the access opening 100, and can be normally maintained in a closed, locked position by means of a latch 106. Latch 106 would be provided with a handle or other means, accessible from within the cabin of the aircraft, to move the latch to a release position, whereby to permit the access panel 102 to be swung to open position to provide access to the switches 90, 92.

It will be observed, in this regard, that extending from the casing 96 are insulated conductors 108, 110. Conductor 108 would contain the leads 70, 80, that extend to and supply current for the interiorly facing signal lamp 54. Conductor 110 would carry, within its covering of insulation, the leads 68, 78 extending to lamp 30.

The relay 74 is mounted, with the battery 64 and flasher 76, within the casing 96, and in accordance with the invention, the components enclosed within said casing would be hermetically sealed against the admission of air, moisture, or the like, and would further be mounted in a manner to resist the forces resulting from a crash of the aircraft.

Switches 88, 90 would be accessible as previously noted herein, and would project upwardly from the casing 96 for this purpose. However, it is important that they be also sealed against the admission of moisture or air, and I therefore will provide these with rubber boots enclosing the handles of the switches. Boots of this type are well known, and a seal is effected at the base of each boot, throughout the circumference thereof, to the edge of the opening through which the handle projects.

Considering the operation of the device in the electrical sense, as previously noted the lamps are normally in an off condition. In these circumstances, the relay winding is also deenergized. The parts at this time appear as in the schematic showing of FIG. 3.

If, now, there is an impact of a sufficient value to trigger the operation of the mechanism, said operation begins by reason of the fact that the inertia switch 92 closes. The inertia switch is, in and of itself, a component known in the art, and can be calibrated to close at a predetermined force impact, as for example a 1–5G force.

In any event, when inertia switch 92 closes, a circuit will be closed from the source of electricity 64 through lead 66, leads 68, 70, and 72, lamps 30, 54, and relay 74, leads 78, 80, and 82, lead 84, the temporarily closed inertia switch 92, lead 86, normally closed switch 88, and back to the current source.

The energizing of relay 74 causes relay contacts 94 to close instantly. Therefore, even if the inertia switch 92 should open immediately, the circuit through the lamps will be maintained, since the current flow will now be through the closed relay contacts 94 between the opposite sides of the circuit, rather than through the inertia switch 92.

As a result of the closing of the relay contacts 94, the relay 74 will lock, remaining energized due to the maintenance of the holding circuit resulting from the closing of the contacts 94. Contacts 94, as a result, will also be maintained in closed position.

Operation of the device is thus assured for the predetermined period of continuous operation, which in a typical installation may be perhaps 24 hours.

The circuit is also arranged to permit one to close it manually, should an emergency develop under circumstances in which the inertia switch 92 either malfunctions or would not, in any event, operate to a closed position. Assuming that such manual operation of the device is desired, one momentarily depresses the plunger of the switch 90. The circuit is temporarily closed in the same manner as when the inertia switch 92 closes, as will be readily apparent. Again, the temporary closing of the circuit causes the winding of the relay to be energized, as a result of which relay contacts 94 close and the relay 74 locks to hold the circuit closed despite the opening of the switch 90.

Such a situation might develop, for example, if the aircraft encounters difficulty necessitating an emergency landing. In this event, the passengers would be alerted to the fact that such a landing is to be made, and a member of the crew opens the panel 102 to manually place the emergency exit and crash locator lamp in operation.

In yet another situation, it may be that the device will go into operation by accidental triggering of the inertia switch. For example, even though there may be no true emergency, the inertia switch either by malfunction or by unexpected imposition of a force of sufficient value, may momentarily close. In this event, a member of the crew can quickly open the circuit to deactivate the device, by operating switch 88 to open position. In this event, the entire circuit, through the lamps and relay, is immediately opened.

Of importance is the fact that in the invention, the casing 96, lamp 54, and crash locator light 30, can all be located in different areas of the aircraft, according to the needs of the particular installation. Casing 96 can be mounted wherever desired, and this is true also of the crash locator light and the emergency exit light. There is no necessity of any one of these being at a predetermined distance or location in respect to any other one of the main components shown in FIG. 1. Conductors 108, 110 can simply be made of a selected length to permit them to be run to the desired areas.

In a typical installation, however, it would probably be true that the components would be located within perhaps four to six feet of one another.

It is also believed obvious that any number of emergency exit lamps 54, and any number of crash locator lights 30, can be provided in a single installation. These would be connected in parallel, of course, in the same manner as has been shown by way of example in FIG. 3. The number of said lamps, of course, would be selected in relation to the output of the battery 64, so as to assure operation of the lamps at the desired intensity.

No attempt has been made herein to specify exact values for the various electrical components, but it will be understood that these values would be established to assure operation of the device through a predetermined period of submersion in water, to assure resistance to flame or heat, and to ensure, further, proper intensity of the lamps so that they may be clearly seen, over prescribed distances. Further, the device would be designed to be resistant, to a predetermined degree, to ordinary vibrations and shocks encountered during regular operation of the aircraft. All these represent design details, it is believed, that may be subject to variation, and may be established as required by the user or by the appropriate regulatory government agencies.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any changes in construction that may be permitted within the scope of the appended claims.

I claim:
1. A combined crash locator and emergency exit signal device for an aircraft having a fuselage formed with spaced inner and outer walls, comprising:
   (a) a casing mountable at a selected location in said fuselage;
   (b) conductors extending from said casing to the inner and outer walls respectively;
   (c) a crash locator light connected to one of said conductors and mounted in said outer wall in position to provide a beacon to speed location of the downed aircraft by a search crew;
   (d) an emergency exit light connected to the other conductor and mounted in said inner wall in position to direct passengers to an exit; and
   (e) means in said casing common to both of said lights for energizing the same in response to deceleration of the aircraft exceeding a predetermined value.

2. A combined crash locator and emergency exit signal device as in claim 1 wherein said crash locator light includes
   (1) a housing,
   (2) means to attach the same at one end to the outer wall of the aircraft in communication with an opening of said wall,
   (3) a beacon lamp within said housing, and
   (4) a lens mounted on said housing and enclosing said lamp, said lens extending at one end beyond said end of the housing whereby to project through said opening of the outer wall.

3. A combined crash locator and emergency exit signal device as in claim 2, and said housing including a tubular body having an axial bore opening at opposite ends of the body, said lens including a dome portion at said one end thereof and a tubular body secured in said bore, said dome portion extending out of the bore beyond one end of the body of the housing.

4. A combined crash locator and emergency exit signal device as in claim 3 wherein the lens body extends substantially the full length of the body of the housing and is formed of electrically insulative material to line the body of the housing with electrical insulation.

5. A combined crash locator and emergency exit signal device as in claim 4 wherein the housing further includes a base affixed to the other end of the body of the housing to close said axial bore at its other end, said beacon lamp being mounted upon said base and being connected to its associated conductor within the base.

6. A combined crash locator and emergency exit signal device as in claim 5 wherein the crash locator light further includes an annular, compressible gasket extending about the dome portion of the lens upon the first named end of the housing body to render leaktight the mounting of the crash locator light upon said outer wall of the fuselage.

7. A combined crash locator and emergency exit signal device as in claim 6 wherein the crash locator light further includes a sealing ring compressed between the base and the housing body to render leaktight the connection therebetween.

8. A combined crash locator and emergency exit signal device as in claim 4 wherein the lens body and the wall of the housing body have cooperating threads to provide for the connection of the lens to the housing.

9. A combined crash locator and emergency exit signal device as in claim 1 wherein said last named means includes
   (1) a source of electrical power,
   (2) a circuit to one side of which said lamps are electrically connected in parallel,
   (3) a normally open inertia switch connected between opposite sides of the circuit to close a circuit through the lamps responsive to closing of the inertia switch, (4) a normally open, manually operable switch connected in parallel with the first named switch across said circuit for manual closing of the circuit through the lamps at the option of a user, and (5) a normally closed main control switch in series with the source of power, said lamps, and said first named switches, for selective opening of the circuit at the option of a user.

10. A combined crash locator and emergency exit signal device as in claim 9, said means for energizing the lamps further including a relay the winding of which is in parallel with the lamps, said relay including a set of normally open contacts connected in parallel with said normally open switches and closing responsive to energization of said winding, whereby to maintain the circuit in a closed condition following temporary closure of one of said normally open switches.

References Cited
UNITED STATES PATENTS 2,620,390  12/1952  Sunderland _____ 340—25
2,959,776  11/1960  Morrah _____ 340—366

JOHN W. CALDWELL, *Primary Examiner.*

A. H. WARING, *Assistant Examiner.*

U.S. Cl. X.R.

240—1.2, 7.7; 340—25, 61, 366